United States Patent
Sizemore et al.

(10) Patent No.: US 12,479,824 B2
(45) Date of Patent: Nov. 25, 2025

(54) METHOD FOR PREPARING IVOSIDENIB AND AN INTERMEDIATE THEREOF

(71) Applicant: SERVIER PHARMACEUTICALS LLC, Boston, MA (US)

(72) Inventors: Jacob Paul Sizemore, Cambridge, MA (US); Shijie Zhang, Cambridge, MA (US); Nha Huu Vo, Cambridge, MA (US)

(73) Assignee: SERVIER PHARMACEUTICALS LLC, Boston, MA (US)

( * ) Notice: Subject to any disclaimer, the term of this patent is extended or adjusted under 35 U.S.C. 154(b) by 890 days.

(21) Appl. No.: 17/634,524

(22) PCT Filed: Aug. 7, 2020

(86) PCT No.: PCT/US2020/045368
§ 371 (c)(1),
(2) Date: Feb. 10, 2022

(87) PCT Pub. No.: WO2021/026436
PCT Pub. Date: Feb. 11, 2021

(65) Prior Publication Data
US 2023/0025411 A1    Jan. 26, 2023

Related U.S. Application Data

(60) Provisional application No. 62/884,480, filed on Aug. 8, 2019.

(51) Int. Cl.
*C07D 401/14*    (2006.01)

(52) U.S. Cl.
CPC ........ *C07D 401/14* (2013.01); *C07B 2200/13* (2013.01)

(58) Field of Classification Search
None
See application file for complete search history.

(56) References Cited

U.S. PATENT DOCUMENTS

2013/0190249 A1    7/2013   Lemieux et al.

FOREIGN PATENT DOCUMENTS

| RU | 2692782 C2 | 6/2019 | |
|---|---|---|---|
| WO | 2013/107291 A1 | 7/2013 | |
| WO | WO-2019104318 A1 * | 5/2019 | ......... C07K 5/06173 |
| WO | 2020/010058 A1 | 1/2020 | |
| WO | 2020/127887 A1 | 6/2020 | |

OTHER PUBLICATIONS

Janeta Popovici-Muller et al: Discovery of AG-120 (Ivosidenib): A First-in-Class Mutant IDH1 Inhibitor for the Treatment of IDH1 Mutant Cancers 11, ACS Medicinal Chemistry Letters, vol. 9, No. 4, Apr. 12, 2018.
International Search Report and Written Opinion for International Patent Application No. PCT/US2020/045368 mailed on Sep. 30, 2020, 11 pages.
International Preliminary Report on Patentability for International Patent Application No. PCT/US2020/045368 mailed on Feb. 8, 2022, 7 pages.
Mino R. Caira, Crystalline Polymorphism of Organic Compounds, Topics in Current Chemistry, 1998, vol. 198, pp. 163-208 (p. 188, par. 2 and 3).

* cited by examiner

*Primary Examiner* — Adam C Milligan
*Assistant Examiner* — Jed A Kucharczk
(74) *Attorney, Agent, or Firm* — GOODWIN PROCTER LLP

(57) ABSTRACT

The present application relates to a method for preparing a substantially and diastereomerically pure crystalline ethanol solvate of Compound IIa and its use for synthesizing Ivosidenib.

31 Claims, 2 Drawing Sheets

METHOD FOR PREPARING IVOSIDENIB AND AN INTERMEDIATE THEREOF

CROSS-REFERENCE TO RELATED APPLICATIONS

This application is a national phase filing under 35 U.S.C. § 371 of International (PCT) Patent Application No. PCT/US2020/45368, filed on Aug. 7, 2020, which claims the benefit of and priority to U.S. Provisional Patent Application No. 62/884,480, filed on Aug. 8, 2019, the disclosures of which are incorporated by reference herein.

BACKGROUND

Isocitrate dehydrogenases (IDHs) catalyze the oxidative decarboxylation of isocitrate to 2-oxoglutarate (i.e., α-ketoglutarate). These enzymes belong to two distinct subclasses, one of which utilizes NAD(+) as the electron acceptor and the other NADP(+). Five isocitrate dehydrogenases have been reported: three NAD(+)-dependent isocitrate dehydrogenases, which localize to the mitochondrial matrix, and two NADP(+)-dependent isocitrate dehydrogenases, one of which is mitochondrial and the other predominantly cytosolic. Each NADP(+)-dependent isozyme is a homodimer.

IDH1 (isocitrate dehydrogenase 1 (NADP+), cytosolic) is also known as IDH; IDP; IDCD; IDPC or PICD. The protein encoded by this gene is the NADP(+)-dependent isocitrate dehydrogenase found in the cytoplasm and peroxisomes. It contains the PTS-1 peroxisomal targeting signal sequence. The presence of this enzyme in peroxisomes suggests roles in the regeneration of NADPH for intraperoxisomal reductions, such as the conversion of 2, 4-dienoyl-CoAs to 3-enoyl-CoAs, as well as in peroxisomal reactions that consume 2-oxoglutarate, namely the alpha-hydroxylation of phytanic acid. The cytoplasmic enzyme serves a significant role in cytoplasmic NADPH production.

The human IDH1 gene encodes a protein of 414 amino acids. The nucleotide and amino acid sequences for human IDH1 can be found as GenBank entries NM_005896.2 and NP_005887.2 respectively. The nucleotide and amino acid sequences for IDH1 are also described in, e.g., Nekrutenko et al., Mol. Biol. Evol. 15:1674-1684(1998); Geisbrecht et al., J. Biol. Chem. 274:30527-30533(1999); Wiemann et al., Genome Res. 11:422-435(2001); The MGC Project Team, Genome Res. 14:2121-2127(2004); Lubec et al., Submitted (DEC-2008) to UniProtKB; Kullmann et al., Submitted (JUN-1996) to the EMBL/GenBank/DDBJ databases; and Sjoeblom et al., Science 314:268-274(2006).

It has been discovered that mutations of IDH1 present in certain cancer cells result in a new ability of the enzyme to catalyze the NADPH-dependent reduction of α-ketoglutarate to R(−)-2-hydroxyglutarate (2HG). The production of 2HG is believed to contribute to the formation and progression of cancer (Dang, L et al., Nature 2009, 462:739-44).

IDH2 (isocitrate dehydrogenase 2 (NADP+), mitochondrial) is also known as IDH; IDP; IDHM; IDPM; ICD-M; or mNADP-IDH. The protein encoded by this gene is the NADP(+)-dependent isocitrate dehydrogenase found in the mitochondria. It plays a role in intermediary metabolism and energy production. This protein may tightly associate or interact with the pyruvate dehydrogenase complex. Human IDH2 gene encodes a protein of 452 amino acids. The nucleotide and amino acid sequences for IDH2 can be found as GenBank entries NM_002168.2 and NP_002159.2 respectively. The nucleotide and amino acid sequence for human IDH2 are also described in, e.g., Huh et al., Submitted (NOV-1992) to the EMBL/GenBank/DDBJ databases; and The MGC Project Team, Genome Res. 14:2121-2127 (2004).

Non-mutant, e.g., wild type, IDH2 catalyzes the oxidative decarboxylation of isocitrate to α-ketoglutarate (α-KG).

It has been discovered that mutations of IDH2 present in certain cancer cells result in a new ability of the enzyme to catalyze the NADPH-dependent reduction of α-ketoglutarate to R(−)-2-hydroxyglutarate (2HG). 2HG is not formed by wild-type IDH2. The production of 2HG is believed to contribute to the formation and progression of cancer (Dang, L et al, Nature 2009, 462:739-44).

Mutations in IDH1 or IDH2 occur in over 70% of diffuse low grade glioma (LGG) tumors. IDH mutations result in accumulation of 2-HG, which is believed to facilitate tumorigenesis through DNA hypermethylation, increased repressive histone methylation, and inhibition of differentiation processes. Studies performed with a tool compound known as AGI-5198, which has been shown to inhibit mutant IDH1 (mIDH1), but not mutant IDH2 (mIDH2), have demonstrated that inhibition of mIDH1 proteins can repress growth of mIDH1-driven gliomas in some model systems (D. Rohle et al. Science 340:626-630 (2013)).

U.S. Pat. No. 9,474,779 B2 and U.S. Pat. No. 9,968,595 B2, hereby incorporated by reference in their entirety, disclose a compound described by the chemical name (S)—N—((S)-1-(2-Chlorophenyl)-2-(3,3-difluorocyclobutylamino)-2-oxoethyl)-1-(4-cyanopyridin-2-yl)-N-(5-fluoropyridin-3-yl)-5-oxopyrrolidine-2-carboxamide, which has been shown to act as an inhibitor of mutant IDH1 proteins in biochemical and cellular assays. Depending upon naming convention, this compound also may be referred to as (2S)—N-{(1S)-1-(2-chlorophenyl)-2-[(3,3-difluorocyclobutyl)amino]-2-oxoethyl}-1-(4-cyanopyridin-2-yl)-N-(5-fluoropyridin-3-yl)-5-oxopyrrolidine-2-carboxamide.

Further, in 2015, the compound was assigned the following INN: ivosidenib. The structure of ivosidenib is described herein as Compound I:

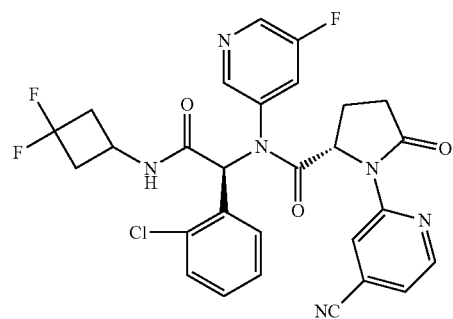

There is a need for an efficient and large-scale manufacturing method for preparing Compound I for use in treating patients with a hematologic malignancy, such as acute myelogenous leukemia (AML), myelodysplastic syndrome (MDS), myeloproliferative neoplasms (MPN), myelodysplastic/myeloproliferative neoplasms, chronic myelomonocytic leukemia (CMML), B-acute lymphoblastic leukemias (B-ALL), or lymphoma (e.g., T-cell lymphoma), or a solid tumor such as glioma, cholangiocarcinoma, chondrosarcoma, prostate cancer, colon cancer, melanoma, or non-small cell lung cancer (NSCLC), each of the foregoing being characterized by the presence of a mutant allele of IDH1. In some embodiments the hematologic malignancy is relapsed or refractory; in other embodiments the hematologic malignancy is newly diagnosed, or the patient is ineligible for intensive induction chemotherapy. In some embodiments the hematological malignancy is relapsed or refractory acute myelogenous leukemia (AML). In other embodiments the hematological malignancy is newly diagnosed acute myelogenous leukemia (AML). In other embodiments the solid tumor is cholangiocarcinoma. In still other embodiments the cholangiocarcinoma is selected from intrahepatic cholangiocarcinoma, perihilar cholangiocarcinoma and distal cholangiocarcinoma. In yet other embodiments the patient has chondrosarcoma. In other embodiments the hematological malignancy or solid tumor is advanced.

BRIEF SUMMARY

In one aspect the present application relates to a method for preparing Compound I comprising isolating a crystalline ethanol solvate of Compound IIa

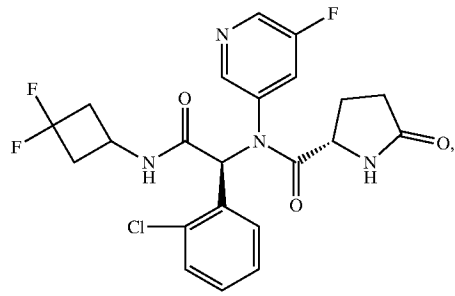

IIa and converting the crystalline ethanol solvate of Compound IIa to Compound I or a solvate thereof. In some aspects, the crystalline ethanol solvate of Compound IIa is substantially chemically and diastereomerically pure. The substantially chemically and diastereomerically pure crystalline ethanol solvate of Compound IIa is also referred to as the "Type A ethanol solvate of Compound IIa". In some embodiments, Compound I is obtained as an isopropyl acetate solvate, which can be converted to other solvates as well as a non-solvate or anhydrous solid form.

In another aspect the present application relates to a method for preparing a Type A ethanol solvate of Compound IIa comprising suspending or dissolving a mixture of Compounds IIa and IIb in solution of a base and an ethanol solvent system, adding a non-polar solvent, and isolating the Type A ethanol solvate of Compound IIa. As used here, the term "suspending" means contacting a material with a solvent or mixture of solvents such that the suspended material is at least partially dissolved.

In another aspect the present application relates to a crystalline Type A ethanol solvate of Compound IIa per se. In some embodiments, the Type A ethanol solvate is substantially chemically pure. In other embodiments the Type A ethanol solvate is substantially diastereomerically pure. In other embodiments the Type A ethanol solvate is substantially chemically and diastereomerically pure.

DETAILED DESCRIPTION OF THE DRAWINGS AND VARIOUS EMBODIMENTS

Figure 1:
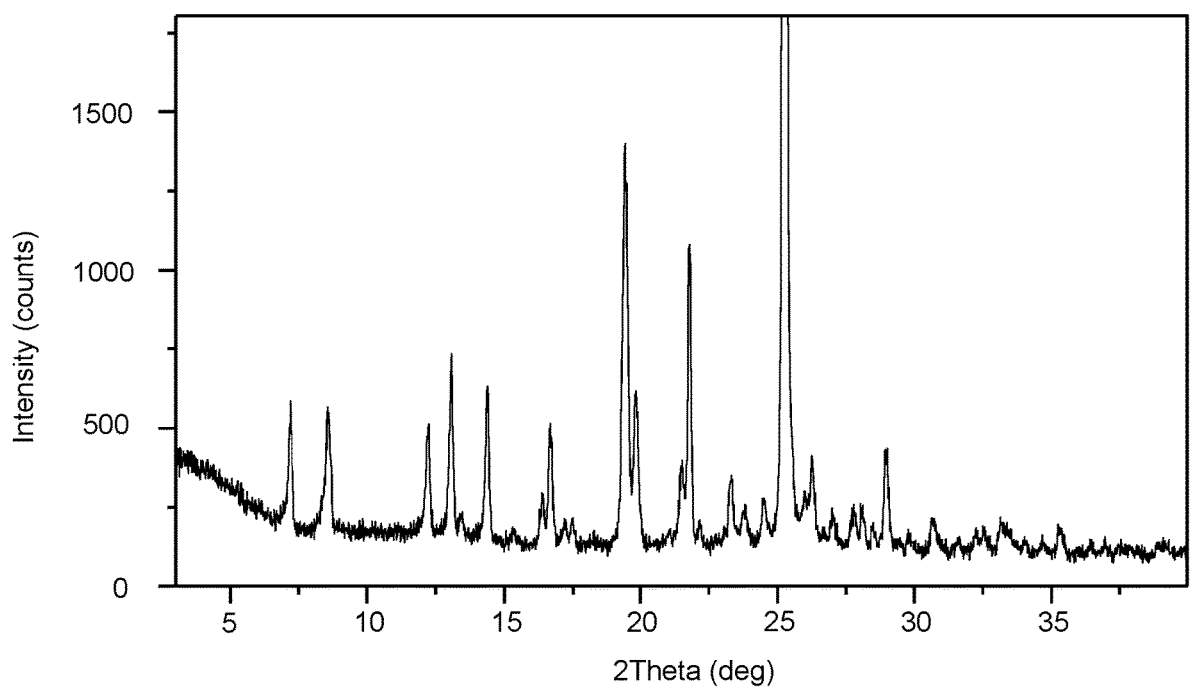
FIG. 1 is an X-ray powder diffractogram (XRPD) of the Type A ethanol solvate of Compound IIa.

In one aspect, the present application relates to a method for stereochemically enriching a mixture of the compounds of Formula II:

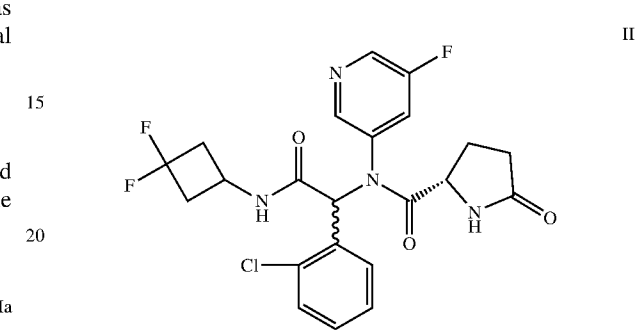

II to afford an ethanol solvate of Compound IIa:

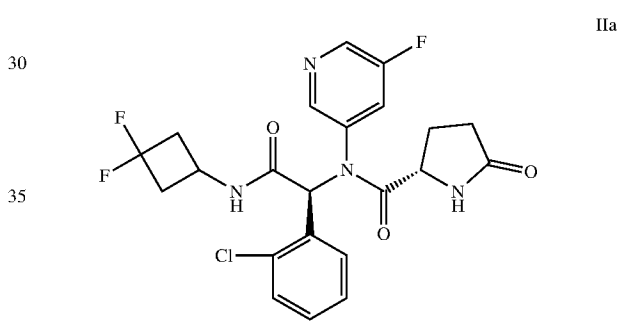

IIa as a substantially chemically and diastereomerically pure crystalline material. As used herein, the term "a substantially chemically and diastereomerically pure" Compound IIa refers to an ethanol solvate of Compound IIa having a diastereomeric excess of at least about 90% and a chemical purity of at least about 80%. In some embodiments, the substantially diastereomerically pure crystalline ethanol solvate of Compound IIa has a diastereomeric excess of at least about 90%, at least about 91%, at least about 92%, at least about 93%, at least about 94%, at least about 95%, at least about 96%, at least about 97%, at least about 98%, at least about 99%, at least about 99.5%, at least 99.7%, at least 99.8%, at least 99.9% (or any percentage between 90% and 100%). As used herein, in the context of chemical purity, the term "about" means ±0.5%. As used herein, in the context of diastereomeric excess, the term "about" also means ±0.5%. As used herein, diastereomeric excess (or de %) is calculated using the following formula:

$$\frac{[Xa - Xb]}{[Xa + Xb]} * 100,$$

wherein Xa and Xb are the molar fractions of the diastereomers IIa and IIb, where Compound IIb has the following structure:

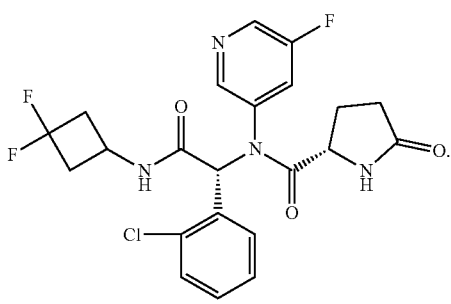

In other embodiments the crystalline ethanol solvate of Compound IIa has a chemical purity of at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.5%, at least 99.7%, at least 99.8%, at least 99.9% by weight (or any percentage between about 90% to about 100%) based on the weight of the compound IIa (on an unsolvated or anhydrous basis). It should be understood that in the context of chemical purity the remaining weight percent generally comprises other materials, such as for example, reaction impurities, starting materials, reagents, side products, and/or other processing impurities arising from the preparation and/or isolation and/or purification steps. For example, the crystalline ethanol solvate of Compound IIa may be deemed to be substantially chemically pure if it has been determined to have a chemical purity of greater than about 80% by weight, as measured by standard and generally accepted methods known in the art, where the remaining less than about 20% by weight constitutes other materials such as other reaction impurities, starting materials, reagents, side products, and/or processing impurities. Chemical purity may be determined according to methods known in the art, for example, high performance liquid chromatography (HPLC), LC-MS (liquid chromatography—mass spectrometry), nuclear magnetic resonance (NMR) spectroscopy, or infrared spectroscopy. One of skill in the art would readily understand these methods and how to employ these additional (or alternative) methods for determining or assessing chemical purity.

More specifically, the present application relates to a method for stereochemically enriching a mixture of the compounds of Formula II to afford the Type A ethanol solvate of Compound IIa as an isolated crystalline material with a diastereomeric excess of at least about 90%, at least about 91%, at least 92%, at least 93%, at least 94%, at least 95%, at least 96%, at least 97%, at least 98%, or at least 99%.

As used herein, the term "a mixture comprising the compounds of Formula II" and "a mixture of the compounds of Formula II" are intended to encompass a mixture of Compounds IIa and IIb where IIa and IIb are present in a ratio of between 1:99 and 99:1. In some embodiments a mixture of compounds of Formula II may be a racemic mixture. In other embodiments of a mixture of compounds of Formula II, Compound IIb may represent greater than 50% of the mixture. In further embodiments of a mixture of compounds of Formula II, Compound IIa may represent greater than 50% of the mixture but less than 100% of the mixture.

It has been found that an ethanol solvate of Compound IIa can be selectively crystallized from mixtures of the compounds of Formula II to afford a substantially chemically and diastereomerically pure ethanol solvate of Compound IIa. Selective crystallization allows for the isolation of the ethanol solvate of Compound IIa with a diastereomeric excess. As used herein, the terms "afford", "isolating", "isolated", and "isolation" refer to obtaining and physically separating Compound I, or a solvate thereof, or an ethanol solvate of Compound IIa from a reaction mixture. As used here, the term "about" means ±0.5%. Isolation of any of the compounds described herein including Compound I, or a solvate thereof, or the ethanol solvate of Compound IIa may be achieved using any method known to those skilled in the art to separate a solid material from a liquid. Examples of separation techniques suitable for isolating Compound I or a solvate of Compound I or the ethanol solvate of Compound IIa include filtration.

As used herein "solvate" refers to a crystalline form of a molecule, atom, and/or ions that further comprises one or more molecules of a solvent or solvents incorporated into the crystalline lattice structure. The solvent molecules in the solvate may be present in a regular arrangement and/or a non-ordered arrangement. The solvate may comprise either a stoichiometric or nonstoichiometric amount of the solvent molecules. For example, a solvate with a nonstoichiometric amount of solvent molecules may result from partial loss of solvent from the solvate or may result directly from the crystallization process. Alternatively, solvates may occur as dimers or oligomers comprising more than one molecule or within the crystalline lattice structure.

As used herein the terms "non-solvate" or "unsolvated" or "anhydrous" refer to a crystalline form that does not have one or more molecules of a solvent or solvents incorporated into the crystalline lattice structure.

Compounds IIa and IIb contain a C—H group that is susceptible to epimerization and interconversion of the stereochemical configuration of the chlorophenyl-substituted carbon of Compounds IIa and IIb. As Compound IIa is depleted from the solution phase of the crystallization mixture (because of the selective crystallization of Compound IIa), the epimerization reaction converts Compound IIb to Compound IIa (and vice versa). Since the epimerization reaction is not likely stereoselective due to the distal relationship of the second chiral center (except for a potential small effect from the second chiral center or a steric factor), a near 50/50 mixture of IIa/IIb is likely maintained in the solution phase. At the same time, the solid phase becomes enriched with Compound IIa (a phenomenon referred to herein as stereochemical enrichment) because it has been found that in some instances Compound IIa is less soluble than Compound IIb and therefore preferentially precipitates out of solution. Thus, by coupling an epimerization reaction with a selective crystallization step, it has been discovered that the resulting "dynamic crystallization" process described herein stereochemically enriches a starting mixture of diastereomers (Compounds IIa and IIb) with Compound IIa (which is then isolated) therefore producing a yield of Compound IIa that is greater than the theoretically possible amount based on the amount of Compound IIa in the starting mixture of diastereomers. For example, if 10 grams of a mixture of compounds of Formula II contains about 5 grams each of Compounds IIa and IIb, the dynamic crystallization process described above could potentially allow for the isolation of Compound IIa in an amount greater than 5 grams.

In some aspects, Compound IIa is crystallized from an ethanol solvent system in the presence of a base to afford a substantially chemically and diastereomerically pure ethanol solvate of Compound IIa. As used herein, the term "ethanol solvent system" is any solvent mixture which comprises at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least 92%, at least 93%, at least 94%, at least 95%, at least 96%, at least 97%, or at least 98% ethanol by volume. In some embodiments the ethanol solvent system contains 100% ethanol. In some embodiments, the ethanol solvent system does not contain toluene, trifluoroethanol (TFE), acetonitrile, N,N-dimethylformamide (DMF), methyl acetate, or MTBE or mixtures comprising any of them unless the ethanol solvent system comprises at least 30% (by volume) of ethanol.

In certain embodiments, the base is a primary, secondary or a tertiary amine. Suitable bases include 1,5,7-triazabicyclo[4.4.0]dec-5-ene ("TBD"), 1,5-diazabicyclo[4.3.0]non-5-ene ("DBN"), triethylamine, diisopropyl amine, N,N-diisopropyl ethylamine, N-methylmorpholine, morpholine, N-methyl-piperazine, pyridine, butylamine, dibutylamine, or 1,5-diazabicyclo(4.3.0)non-5-ene, or a combination thereof.

The dynamic crystallization process may be conducted at a temperature of −5 to 25° C., −5 to 20° C., 0 to 25° C., 5 to 20° C., 10 to 18° C., 12 to 18° C., 12 to 17° C., 12 to 16° C., or 12 to 15° C.

In certain embodiments, the dynamic crystallization process is carried out in the presence of at least 0.05 equivalents, at least 0.10 equivalents, at least 0.15 equivalents, at least 0.20 equivalents, or at least 0.25 equivalents of the base per equivalent of Compounds IIa and IIb. In other embodiments, the dynamic crystallization process is carried out in the presence of about 0.04 equivalents, about 0.07 equivalents, about 0.10 equivalents, about 0.13 equivalents, about 0.16 equivalents, about 0.19 equivalents, about 0.22 equivalents, or about 0.25 equivalents of the base per equivalent of Compounds IIa and IIb. As used here, the term "equivalent of Compounds IIa and IIb" refers to the total equivalents of the two compounds present in a mixture of compounds of Formula II. In other embodiments, the dynamic crystallization is carried out in the presence of about 0.05 to about 0.10 equivalents, about 0.10 to about 0.15 equivalents, or about 0.15 to about 0.20 equivalents of the base per equivalent of Compounds IIa and IIb. As used in the context of equivalents of base, the term "about" means ±0.02 equivalents. In some embodiments of the dynamic crystallization process of the application the amount of base that is used is catalytic. As used herein the terms "catalytic" and "catalytic amount" refer to between about 0.04 equivalents to about 0.25 equivalents of the base per equivalent of Compounds IIa and IIb. In some embodiments, the catalytic amount of the base is about 0.04 equivalents to about 0.07 equivalents, about 0.04 equivalents to about 0.10 equivalents, about 0.04 equivalents to about 0.13 equivalents, about 0.04 equivalents to about 0.16 equivalents, about 0.04 equivalents to about 0.19 equivalents, or about 0.04 equivalents to about 0.22 equivalents of the base per equivalent of Compounds IIa and IIb. In other embodiments, the catalytic amount of the base is up to about 0.04 equivalents, up to about 0.07 equivalents, up to about 0.10 equivalents, up to about 0.13 equivalents, up to about 0.16 equivalents, up to about 0.19 equivalents, up to about 0.22 equivalents, or up to about 0.25 equivalents of the base per equivalent of Compounds IIa and IIb.

The optimal conditions to prepare and isolate a substantially chemically and diastereomerically pure ethanol solvate of Compound IIa using the dynamic crystallization process of the present application generally depend on the crystallization temperature, the solvent, the base, and the amount of the base. For example, at the higher end of the temperature range described above, a degradation process becomes more prevalent than at lower temperatures. Higher concentrations of the base can also increase the degradation of the product. In addition, given that the compounds of Formula II contain peptide bonds, nucleophilicity of the base may also contribute to the degradation of the compounds. However, even if one uses high temperatures, high concentrations of the base, and/or a nucleophilic base, the dynamic crystallization process may still produce a stereochemically enriched Compound IIa, albeit with some degradation products that may necessitate further purification of the isolated ethanol solvate compound.

In another aspect, the present application relates to a method of preparing a substantially chemically and diastereomerically pure crystalline ethanol solvate of Compound IIa (i.e., Type A ethanol solvate of Compound IIa) comprising crystallizing Compound IIa from a mixture of the compounds of Formula II from an ethanol solvent system in the presence of a base. More specifically, the present application relates to a method of preparing the Type A ethanol solvate of Compound IIa comprising suspending or dissolving a mixture comprising the compounds of Formula II in an ethanol solvent system, adding a base, and stirring the resulting suspension or solution at a temperature below 25° C. for at least eight hours, before dropwise addition of a non-polar aprotic solvent (such as, for example, a hexane, cyclohexane, or methylcyclohexane or a heptane) or mixture of non-polar aprotic solvents, followed by separation of the ethanol solvate as a solid via filtration. In some embodiments, a solution or suspension of a base and a mixture comprising the compounds of Formula II in an ethanol solvent system is stirred at a temperature of −5 to 25° C., −5 to 20° C., 0 to 25° C., 5 to 20° C., 10 to 18° C., 12 to 18° C., 12 to 17° C., 12 to 16° C., or 12 to 15° C. for up to 12 hours, up to 14 hours, up to 16 hours, up to 18 hours or up to 20 hours before the non-polar aprotic solvent or mixture of non-polar aprotic solvents is added to the suspension or solution. In some embodiments the non-polar aprotic solvent may be selected from carbon tetrachloride, benzene, diethyl ether, chloroform, methyl tert-butyl ether (MTBE), dioxane, or toluene or a mixture of any two or more of the foregoing. In some embodiments the non-polar aprotic solvent may be selected from pentane, cyclopentane, n-heptane, n-hexane, cyclohexane, or methylcyclohexane or a mixture of any two or more of the foregoing. In some embodiments the non-polar aprotic solvent or mixture of solvents are added dropwise to the suspension or solution over a period of about one minute to about twenty-four hours. In some embodiments the non-polar aprotic solvent or mixture of solvents is added to the suspension or solution all at once or in two or more portions over a period of about one minute to about twenty-four hours.

Any base that can epimerize Compound IIa to Compound IIb (or vice versa) may be suitable. Although the choice of base may contribute to the degradation of the compounds of Formula II (which is undesirable), the dynamic crystallization process need not avoid degradation altogether. Instead, the extent of degradation of the compounds should be weighed against the yield of the stereochemically enriched Compound IIa that is isolated.

Suitable bases for the epimerization reaction include 1,5,7-triazabicyclo[4.4.0]dec-5-ene ("TBD"), 1,5-Diazabicyclo[4.3.0]non-5-ene ("DBN"), triethylamine, diisopropyl amine, N,N-diisopropyl ethylamine, N-methylmorpholine, morpholine, N-methyl-piperazine, pyridine, butylamine, dibutylamine, or 1,5-diazabicyclo(4.3.0)non-5-ene, or a combination thereof.

In certain embodiments, the dynamic crystallization process is carried out in the presence of at least 0.05 equivalents, at least 0.10 equivalents, at least 0.15 equivalents, at least 0.20 equivalents, or at least 0.25 equivalents of the base per equivalent of Compounds IIa and IIb. In other embodiments, the dynamic crystallization is carried out in the presence of about 0.04 equivalents, about 0.07 equivalents, about 0.10 equivalents, about 0.13 equivalents, about 0.16 equivalents, about 0.19 equivalents, about 0.22 equivalents, or about 0.25 equivalents of the base per equivalent of Compounds IIa and IIb. In other embodiments, the dynamic crystallization process is carried out in the presence of about 0.05 to about 0.10 equivalents, about 0.10 to about 0.15 equivalents, or about 0.15 to about 0.20 equivalents of the base per equivalent of Compounds IIa and IIb. In some embodiments of the dynamic crystallization process of the application the amount of base that is used is catalytic.

In some embodiments, the Type A ethanol solvate of Compound IIa may be prepared by adding a mixture of the compounds of Formula II to an ethanol solvent system, adding a base, and stirring the mixture at −5 to 25° C., −5 to 20° C., 0 to 25° C., 5 to 20° C., 10 to 18° C., 12 to 18° C., 12 to 17° C., 12 to 16° C., or 12 to 15° C. for up to 12 hours, 14 hours, 16 hours, 18 hours or 20 hours before dropwise addition of a non-polar solvent such as n-heptane or a mixture of non-polar solvents, followed by an isolation step.

The Type A ethanol solvate of Compound IIa may be identified by one or more of the following characteristics: at least about 90%, at least about 91%, at least 92%, at least 93%, at least 94%, at least 95%, at least 96%, at least 97%, at least 98%, or at least 99% diastereomeric excess and an X-ray powder diffraction pattern that is substantially as depicted in FIG. 1 wherein the XRPD patterns were measured using a powder diffractometer equipped with a Cu X-ray tube source. Table 1 lists the angles, ° 2θ±0.2°, and d-spacing of the diffraction peaks identified in the experimental XRPD pattern of FIG. 1. As used here in connection to the diastereomeric excess, the term "about" means ±2.5%.

TABLE 1

2θ and d-spacing of the X-ray powder diffractogram of the Type A ethanol solvate of Compound IIa.

| Angle [° 2θ] | d-spacing [Å] | Rel. Int. [%] |
|---|---|---|
| 7.2 | 12.29 | 6.81 |
| 8.6 | 10.30 | 7.29 |
| 12.2 | 7.24 | 6.28 |
| 13.1 | 6.77 | 10.58 |
| 13.4 | 6.59 | 1.27 |
| 14.4 | 6.16 | 9.30 |
| 15.3 | 5.78 | 0.75 |
| 16.4 | 5.40 | 3.01 |
| 16.7 | 5.31 | 7.13 |
| 17.2 | 5.15 | 1.22 |
| 17.5 | 5.07 | 1.51 |
| 19.4 | 4.57 | 23.66 |

TABLE 1-continued

2θ and d-spacing of the X-ray powder diffractogram of the Type A ethanol solvate of Compound IIa.

| Angle [° 2θ] | d-spacing [Å] | Rel. Int. [%] |
|---|---|---|
| 19.8 | 4.48 | 9.22 |
| 21.5 | 4.13 | 5.00 |
| 21.8 | 4.08 | 18.57 |
| 22.2 | 4.01 | 1.39 |
| 23.3 | 3.82 | 4.15 |
| 23.8 | 3.74 | 2.22 |
| 24.5 | 3.63 | 2.93 |
| 25.2 | 3.53 | 100.00 |
| 26.3 | 3.39 | 5.32 |
| 27.0 | 3.30 | 2.04 |
| 27.8 | 3.21 | 2.13 |
| 28.1 | 3.18 | 2.19 |
| 28.5 | 3.13 | 1.41 |
| 29.0 | 3.08 | 5.85 |
| 29.8 | 3.00 | 0.93 |
| 30.7 | 2.91 | 1.97 |
| 31.6 | 2.83 | 0.64 |
| 32.3 | 2.78 | 1.21 |
| 32.6 | 2.75 | 1.30 |
| 33.2 | 2.70 | 1.96 |
| 34.7 | 2.59 | 0.62 |
| 35.3 | 2.54 | 1.44 |
| 36.5 | 2.47 | 0.55 |
| 37.0 | 2.43 | 0.61 |
| 37.5 | 2.40 | 0.51 |
| 39.1 | 2.31 | 0.48 |

In some embodiments the Type A ethanol solvate of Compound IIa may be characterized by an X-ray powder diffraction (XRPD) pattern comprising one or more of the following peaks at 2θ: 7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°. In some embodiments, the Type A ethanol solvate of Compound IIa may be characterized by an X-ray powder diffraction (XRPD) pattern comprising one, two, three, four, five, or six of the following peaks at 2θ: 7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°. In some embodiments, the Type A ethanol solvate of Compound IIa may be characterized by an X-ray powder diffraction (XRPD) pattern comprising three or more of the following peaks at 2θ: 7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

As used herein the term "an X-ray powder diffraction (XRPD) pattern substantially as depicted" in a defined figure means that for comparison purposes, at least 50% of the most intense peaks shown in the figure are present. It is to be further understood that for comparison purposes some variability in 2-theta peak positions from those shown is allowed, such as ±0.2 degrees, and that this variability applies to each peak position.

The crystalline Type A ethanol solvate of Compound IIa may also be characterized by differential scanning calorimetry ("DSC") and thermogravimetric analysis ("TGA"). In one embodiment, crystalline Type A ethanol solvate of Compound IIa exhibits a DSC thermogram comprising three endotherms at 120.6° C. (peak temperature), 136.4° C. (peak temperature) and 203.4° C. (onset temperature). The Type A ethanol solvate of Compound IIa may also be characterized by a weight loss of up to 10 wt % at 150° C. or below as determined by TGA. In some embodiments the Type A ethanol solvate of Compound IIa is characterized by a weight loss of at least 8.0 wt %.

Figure 2:
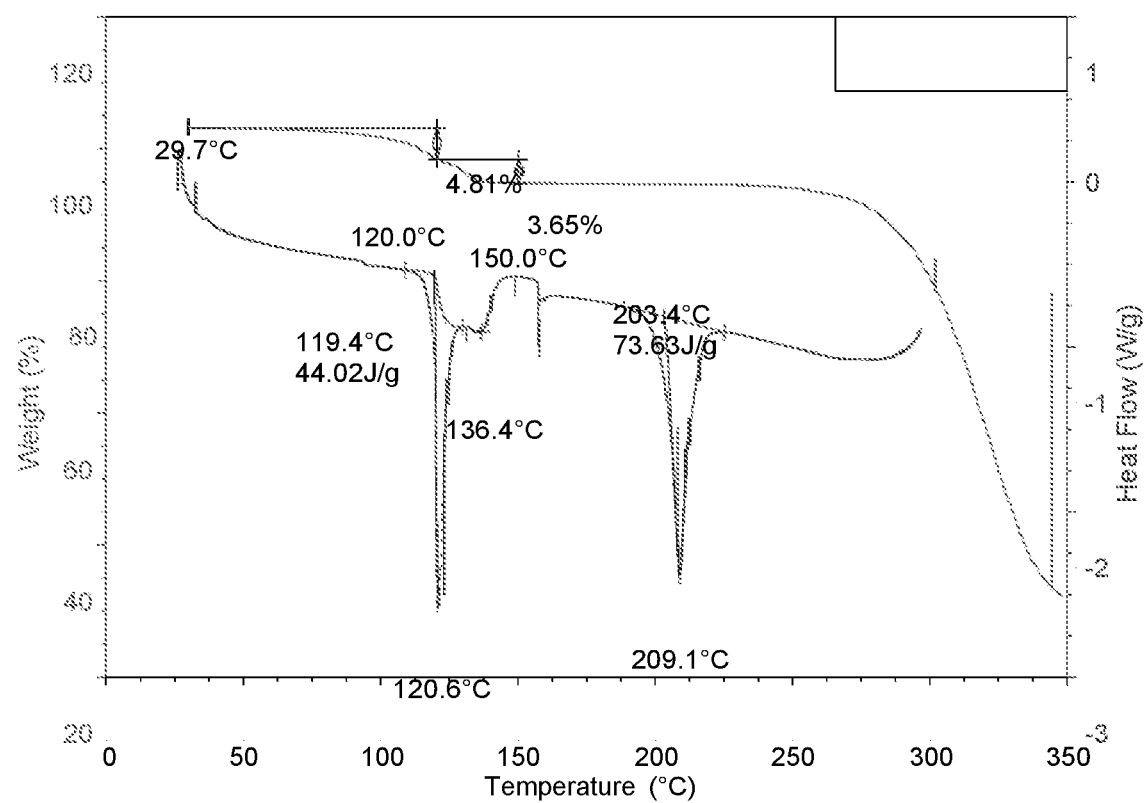
FIG. 2 contains differential scanning calorimetry (DCS) and thermal gravimetric analysis (TGA) profiles of the Type A ethanol solvate of Compound IIa.

FIG. 2 shows DSC and TGA thermograms of the Type A ethanol solvate of Compound IIa.

In another aspect, the present application relates to a method for preparing Compound I comprising obtaining a substantially chemically and diastereomerically pure Type A crystalline ethanol solvate of Compound IIa and converting it to Compound I.

In some aspects, obtaining a substantially chemically and diastereomerically pure Type A crystalline ethanol solvate of Compound IIa comprises stereochemically enriching and selectively crystallizing Compound IIa from an ethanol solvent system using the dynamic crystallization process described above. Any mixture of the compounds of Formula II may be the starting point for obtaining a substantially chemically and diastereomerically pure Type A crystalline ethanol solvate of Compound IIa. In some embodiments, substantially chemically and diastereomerically pure Compound IIb can be the starting point for obtaining a substantially chemically and diastereomerically pure crystalline ethanol solvate of Compound IIa.

The mixture of compounds of Formula II may be prepared in accordance of any method known to those skilled in the art. The starting materials for preparing the mixture of compounds of Formula II are known in the art or can be prepared in accordance with methods known to those skilled in the art as exemplified by the methods described in WO2013107291, WO2007076034, WO2006067445, WO2006067445, Atkinson, J. G. et al., J. Amer. Chem. Soc. 90:498 (1968), Berkessel. A. et al., Angew Chemie, Int Ed. 53:11660 (2014); Angew. Chem. Int. Ed. Sun, X. et al., 52:4440 (2013), Topolovčan, N. et al., Eur. J. Org. Chem. 2868 (2015), and Pavlik, J. W. et al., J Heterocyclic Chem. 42:73(2005), all of which are incorporated by reference in their entireties herein.

For example, a mixture of the compounds of Formula II may be prepared in accordance with Scheme 1.

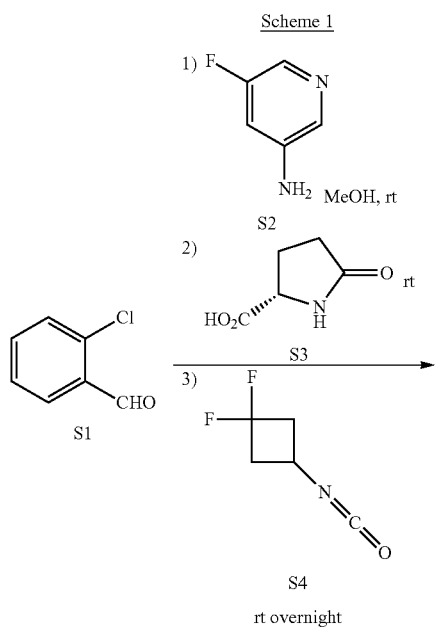

Scheme 1

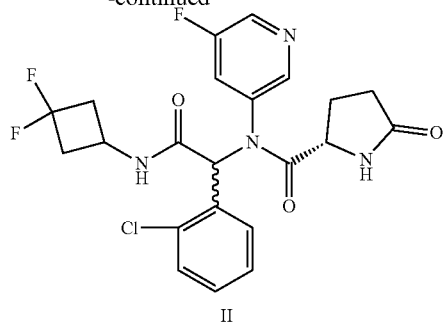

II

In Scheme 1, a mixture of the compounds of Formula II may be synthesized by reacting benzaldehyde S1 with primary amine S2 in methanol, followed by reacting the resulting product with oxopyrrolidine-2-carboxylic acid S3 and isocyanatocyclobutane S4, to give the compounds of Formula II.

The mixture of the compounds of Formula II may undergo the dynamic crystallization process of the present application to obtain a substantially chemically and diastereomerically pure Type A crystalline ethanol solvate of Compound IIa in accordance with the process depicted in Scheme 2.

Scheme 2

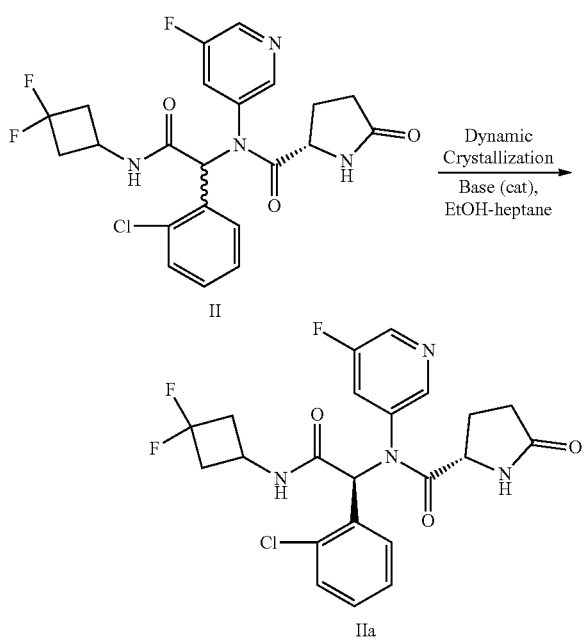

Upon dynamic crystallization, a substantially chemically and diastereomerically pure Type A crystalline ethanol solvate of Compound IIa may be isolated with a diastereomeric excess of at least about 90%, at least about 91%, at least 92%, at least 93%, at least 94%, at least 95%, at least 96%, at least 97%, at least 98%, or at least 99% may be obtained.

A substantially chemically and diastereomerically pure Type A crystalline ethanol solvate of Compound IIa may be converted to Compound I in accordance of any method known to those skilled in the art. For example, a substantially chemically and diastereomerically pure Type A crystalline ethanol solvate of Compound IIa may be converted to Compound I in accordance with Scheme 3. In Scheme 3, a Buchwald reaction of Compound IIa with bromoisonicotinonitrile affords Compound I.

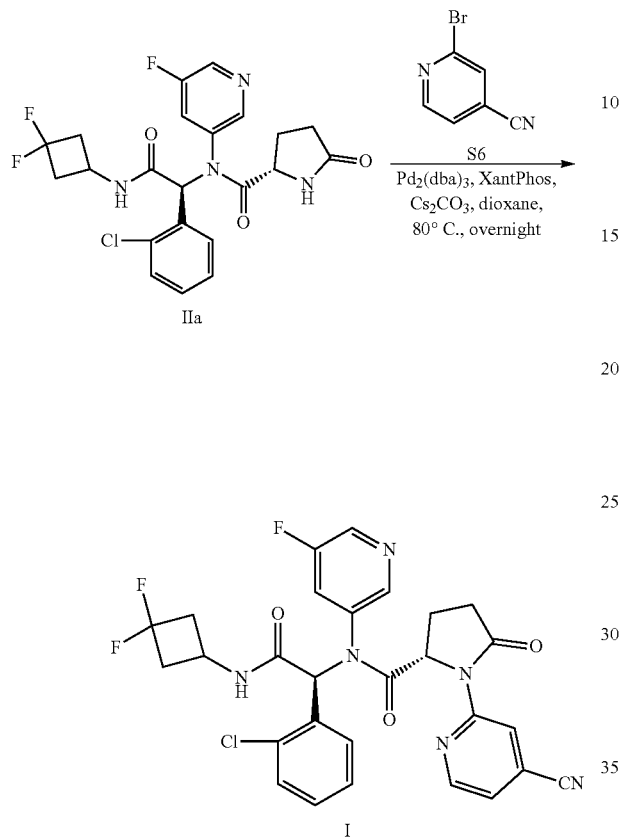

Alternatively, a substantially chemically and diastereomerically pure Type A crystalline ethanol solvate of Compound IIa may be converted to Compound I in accordance with Scheme 4. In Scheme 4, Compound I is synthesized by reacting Compound IIa with ethyl 2-bromoisonicotinate to give intermediate S9. Reduction of intermediate S9 in the presence of $NH_3$ provides amide S10. Amide S10 is then reacted with trifluoroacetic anhydride (TFAA) in the presence of pyridine and an appropriate solvent to obtain Compound I. Suitable solvents include THF.

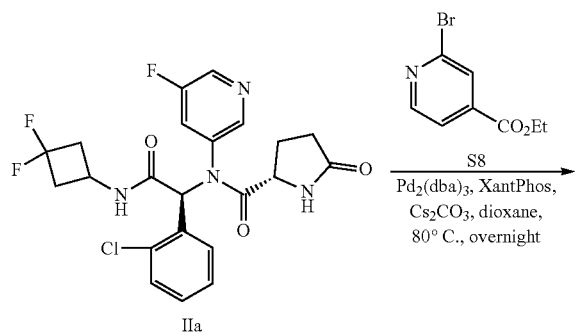

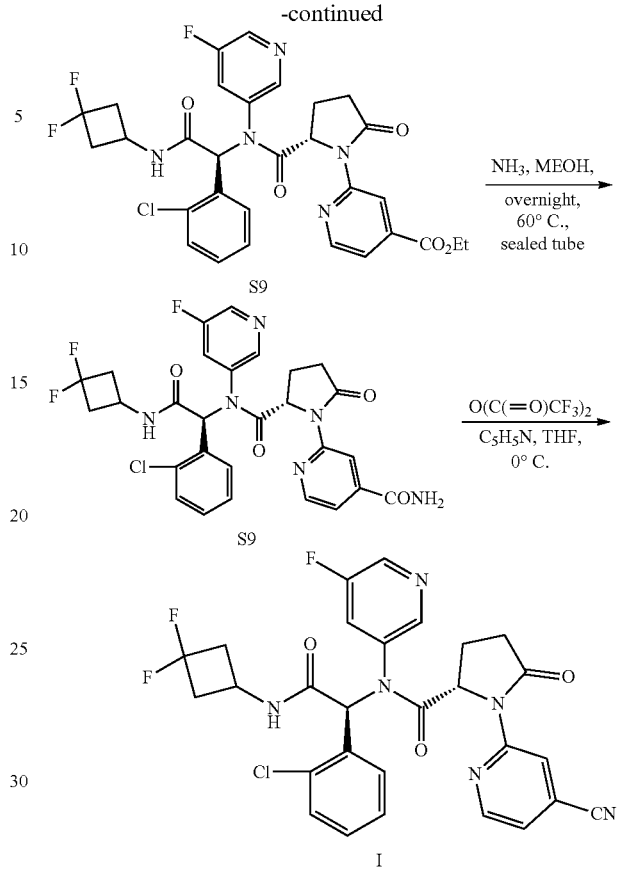

EXPERIMENTAL SECTION

The following examples are provided here for illustrative purposes and in no way constitute limitations to any of the claims.

Abbreviations

TBD: 1,5,7-triazabicyclo[4.4.0]dec-5-ene.
DBU: 1,8-diazabicyclo[5.4.0]undec-7-eneDBN: 1,5-Diazabicyclo[4.3.0]non-5-ene.
EtOAc: Ethyl acetate.
IPAc: isopropyl acetate.
EtOH: Ethanol.
I—PrOH: isopropyl alcohol.
n-BuOH: n-butanol.
t-BuOH: t-butanol.
DCM: dichloromethane.
THF: tetrahydrofuran.
2-MeTHF: 2-methyl tetrahydrofuran.
DMF: dimethylformamide.
DMSO: dimethyl sulfoxide.
RT (or rt): Room Temperature
As used herein, "LCAP", which stands for "liquid chromatography area percent", means the percentage of the peak area of the compounds of interest in relation to total area of peaks.
HPLC experiments were conducted using an Agilent 1100 with DAD detector with Phenomenex Cellulos-4, 250×4.6 mm, 5 μm column and hexane/ethanol as mobile phase.
$^1$H NMR: $^1$H Solution NMR was collected on a Bruker 400 MHz NMR Spectrometer using DMSO-$d_6$.

DSC thermal analysis was performed on a TA Q2000 DSC (from TA Instruments). Samples were prepared with crimped aluminum pans and tested from RT to desired temperature at a heating rate of 10° C./min using $N_2$ as the purge gas.

TGA thermal analysis was conducted on a TA Q5000 TGA (also from TA Instruments). Samples were prepared with crimped aluminum pans and tested from RT to a desired temperature at a heating rate of 10° C./min with 60 s modulation using $N_2$ as the purge gas.

X-ray powder diffraction samples were illuminated with Cu Kα1 (1.540598 Å) and Cu Kα2 (1.544426 Å) radiations at Kα1/Kα2 ratio of 0.50 and XRPD data were collected from 3 to 40° 2θ.

Dynamic Crystallization of a Mixture Comprising Compounds IIa and IIb

A 53:47 mixture of the compounds of Formula II (100 g, 89 A % by HPLC, 185.0 mmol) in ethanol (300 mL) was combined at 15° C. with 1,5,7-triazabicyclo[4.4.0]dec-5-ene (2.0 g, 14.4 mmol) and subsequently agitated at 14-17° C. for 20 h. n-Heptane (300 mL) was added dropwise to the reaction mixture. After further agitation at 14-17° C. for 1 h, the solids were collected by filtration. The filter cake was washed with EtOH/n-heptane (200 mL, 1v/1v) below 25° C. and dried in vacuum at 50° C. to afford Compound IIa as a white solid, ethanol solvate (58.5 g, 99.4 A % purity, 65% yield) in >99.9:0.1 ratio of Compounds IIa to IIb.

1H NMR (400 MHz, DMSO-$d_6$) δ 9.0-8.9 (bm, 2H), 8.41 (d, J=2.6 Hz, 1H), 8.02 (bs, 1H), 7.75 (s, 1H), 7.41 (dd, J=8.1, 1.3 Hz, 1H), 7.21 (td, J=7.7, 1.7 Hz, 1H), 7.11 (td, J=7.6, 1.3 Hz, 1H), 6.89 (dd, J=7.7, 1.6 Hz, 1H), 6.38 (bs, 1H), 4.14 (p, J=6.5 Hz, 1H), 4.00 (bs, 1H), 3.05 to 2.84 (m, 2H), 2.7 to 2.3 (m, 2H), 2.10 (ddd, J=16.8, 9.5, 7.6 Hz, 1H), 2.03 to 1.92 (m, 1H), 1.90 to 1.70 (m, 2H). Ethanol δ (4.34, t, J=5.1 Hz, 1H), 3.43 (dq, J=6.9, 4.9 Hz, 2H), 1.04 (t, J=7.0 Hz, 3H). LC MS for Compound IIa ESI(+) found [M+H]+ 481.

Synthesis of Compound I According to Scheme 2

In one embodiment a substantially chemically and diastereomerically pure crystalline ethanol solvate of Compound IIa is converted to Compound I. Such conversion involves stirring Compound IIa (0.20 mmol), 2-bromoisonicotinonitrile (0.30 mmol), $Cs_2CO_3$ (129 mg, 0.39 mmol), $Pd_2(dba)_3$ (18 mg, 0.02 mmol) and Xant-Phos (9.4 mg, 0.02 mmol) in 1,4-dioxane (10 mL) under $N_2$ at 80° C. overnight. After filtration, the filtrate is concentrated in vacuo and the residue is purified by a standard method to give Compound I.

Synthesis of Compound I According to Scheme 3

Alternatively, according to Scheme 3, Compound IIa and ethyl 2-bromoisonicotinate (compound S8) are combined in a solvent to undergo a Buchwald reaction to give Compound S9. The ethyl ester of Compound S9 can be reduced to form amide S10, which can undergo a further condensation reaction to introduce the nitrile functional group in Compound I.

Specifically, a mixture of a substantially chemically and diastereomerically pure crystalline ethanol solvate of Compound IIa (0.20 mmol), 2-bromoisonicotinate (0.30 mmol), $Cs_2CO_3$ (129 mg, 0.39 mmol), $Pd_2(dba)_3$ (18 mg, 0.02 mmol) and Xant-Phos (9.4 mg, 0.02 mmol) in 1,4-dioxane (10 mL) is stirred under $N_2$ at 80° C. overnight. After filtration, the filtrate is concentrated in vacuo and the residue is purified by a standard method to give Compound S9. A mixture of Compound S9 (0.3 mmole), $NH_3$ (0.4-1 mmole), and MeOH are stirred overnight at 60° C., in a sealed tube. After filtration, the filtrate is concentrated in vacuo and the residue is purified by a standard method to give Compound S10. A mixture of Compound S10 (0.3 mmole), pyridine, and TFAA is stirred in THF at 0° C. overnight. The reaction mixture is concentrated in vacuo and the residue is purified by a standard method to give Compound I.

Epimerization Chemistry

The optimum conditions for the dynamic crystallization would generally involve a fast epimerization reaction with minimal degradation of the compounds. For a compound susceptible to epimerization, the optimum conditions for accomplishing fast epimerization with minimal degradation generally depends on the reaction temperature, the base, the concentration of the base and the solvent. Numerous experiments were conducted to show that the dynamic crystallization process of the present application would improve the efficiency of a large-scale manufacturing method for preparing Compound I.

When substantially chemically and diastereomerically pure Compound IIa was combined with TBD (0.1 eq) in 95% EtOH at room temperature, the ratio of Compound IIa to IIb was found to be to 87.5%/12.5% after 2 h (entry 1). Some decomposition was also observed, as indicated by additional peaks in the HPLC spectrogram. After 24 h, the ratio was still 87.1%/12.9%. This showed the epimerization reaction was quite fast (albeit incomplete) with a catalytic amount of TBD at room temperature.

The epimerization reaction was found to be slower with DBN (0.1 eq) in EtOH with only 2.8% of Compound IIb observed after 2 h at room temperature (entry 2). However, the ratio of IIa to IIb was found to be to 86.3%/13.7% after 24 h. Decomposition peaks were also observed by HPLC.

When Compound IIa was combined with TBD (0.1 eq) in a mixture of EtOAc/n-heptane (1/1), only 4.2% of IIb was observed after 4 h at room temperature and the amount of IIb did not increase after 24 h (entry 3).

However, when Compound IIa was combined with TBD in a mixture of EtOAc/n-heptane (3/1), the ratio of IIa to IIb was 85.1%/14.9% after 4 h at room temperature (entry 4) and the ratio did not change much after 24 h. Fewer decomposition products (compared to the EtOH reaction above) were observed.

In another experiment, entry 5, 20 g of compound IIa was combined with TBD (0.1 eq) in EtOAc (200 mL, 10V) at 40° C. for 5 h. The ratio of IIa to IIb was found to be 63.0%/37.0%, and no degradation was noted. The reaction mixture was then cooled to room temperature, and washed with aqueous HCl, followed by brine. The organic layer was dried with anhydrous $Na_2SO_4$, and concentrated to dryness to give 20 g of a mixture of IIa/IIb as a white solid with an observed ratio of 63.6%/36.4%. This material was used for further epimerization studies.

TABLE 1

Screening epimerization reaction with substantially chemically and diastereomerically pure Compound IIa

| Entry | Base | Solvent | Temp | IIa/IIb ratio |
|---|---|---|---|---|
| 1 | TBD (0.1 eq.) | 95% EtOH | RT | 2 h: 87.5/12.5<br>24 h: 87.1/12.9 |
| 2 | DBN (0.1 eq.) | EtOH | RT | 2 h: 97.2/2.8<br>24 h: 86.3/13.7 |
| 3 | TBD (0.1 eq.) | EtOAc/Heptane (1/1) | RT | 4 h: 95.8/4.2<br>24 h: 96.4/3.6 |
| 4 | TBD (0.1 eq.) | EtOAc/Heptane (3/1) | RT | 4 h: 85.1/14.9<br>24 h: 85.9/14.1 |
| 5 | TBD (0.1 eq.) | EtOAc(WV) | RT to 40° C. | 5 h: 63.0/37.0 |

A mixture comprising Compounds IIa and IIb at a respective ratio of 15/85 (and with 83.7% LCAP) was epimerized in various solvents and in the presence of 0.1 eq of TBD, DBU or DBN in EtOAc or IPAc (entries 6-10), the ratio of IIa/IIb increased to ~1/1 with no further increase even after 24 h. Significant amounts of decomposition were observed, with a reduction of the chemical purity to 42-68% (from 83.7%). See entries 6-10 in table 2.

Compared to DBU and DBN, the epimerization was faster with TBD in IPAc with the ratio of IIa/IIb increasing to ~1/1 in ~2 h (entry 8). Therefore, TBD was selected as the base for further study.

In a mixture of EtOAc/EtOH (3/1 V/V) with 0.1 eq of TBD, the ratio of IIa/IIb increased to ~1/1 in a few hours at 10° C. (entry 11). This ratio did not increase further after 20 h. However, compared to EtOAc or IPAc as solvent, the decomposition in a mixture of EtOAc/EtOH (3/1 V/V) did not increase significantly after overnight at 10° C. (with LCAP remaining ~74% throughout).

The epimerization was scaled up to 20 g using the conditions of entry 12. After 3 h at 10° C., the reaction mixture (IIa/IIb ~49/51) was filtered to obtain 4 g of IIa in 99.8% chiral purity and 98.2% LCAP purity (entry 12).

When a mixture of IIa and IIb (with IIa/IIb ratio ~49/51) was stirred in EtOH with 0.1 eq of TBD at 15° C. for 26 h, a ratio of IIa/IIb in the solid was ~75/25 with LCAP still ~77% (entry 13).

TABLE 2

Epimerization with different bases and solvents (starting ratio of IIa/IIb is 15/85)

| Entry | Solvent | Base | Results |
|---|---|---|---|
| 6 | EtOAc | DBU | 2 h: solution, 27/73 |
|  |  |  | 24 h: solution, 52/48, LCAP: 67.8% |
| 7 | EtOAc | DBN | 2 h: solution, 30/70 |
|  |  |  | 24 h: solution, 56/44, LCAP: 42.1% |
| 8 | IPAc | TBD | 2 h: solution, 50/50 |
|  |  |  | 24 h: slurry, 53/47, LCAP: 67.8% |
| 9 | IPAc | DBU | 2 h: solution, 24/76 |
|  |  |  | 24 h: cloudy, 51/49, LCAP: 56.1% |
| 10 | IPAc | DBN | 2 h: solution, 25/75 |
|  |  |  | 24 h: cloudy, 52/48, LCAP: 59.3% |
| 11 | EtOAc/EtOH (3/1) | TBD | 6 h: solution, 52/48, LCAP: 76.6% |
|  |  |  | 20 h: slurry, 55/45, LCAP: 74.3% |
| 12 20 g | EtOAc/EtOH (3/1) | TBD | 2 h: solution, 47/53, LCAP: 77.1% |
|  |  |  | 3 h: slurry, 49/51 |
|  |  |  | 4 g isolated (20% yield), 99.8%, LCAP: 98.2% |
| 13 | EtOH | TBD | 2 h: solution, 46/54 |
|  |  |  | 26 h: solution, 75/25, LCAP: 77.8% |

Reaction Conditions: Crude IIa/IIb (15/85, LCAP: 83.7%) (entry 6-10: 100 mg, entry 11 and 13: 1 g, entry 12: 20 g,) was stirred with 0.1 eq of bases in solvents (2 V) at RT (except entry 11 and 12: 10° C., entry 13: 15° C.).

Optimization of Temperature for Epimerization in EtOH (Starting Ratio of IIa/IIb is 15/85)

The reaction temperature was further optimized for the epimerization reaction in EtOH. With 0.1 eq of TBD, the epimerization was too slow at −5° C. and 5° C. in EtOH. The ratio of IIa/IIb increased to ~50/50 from 15/85 even after ~24 h (entries 14-16). Only 5.5 g of solid was obtained from a 20 g run.

The ratio of IIa/IIb increased to 70/30 and 68/32 after 24 h at 10° C. and 12° C. respectively (entries 17 and 18). At 15° C. (entries 19 and 20), a IIa/IIb ratio of 82/18 from 15/85 after 24 h was observed in the reaction mixture. After filtration and drying, 9.5 g of solid was obtained from a 20 g run. The chiral purity was 99.9% and 98.4% LCAP. At 20° C. after 24 h, the decomposition was more severe with ~55% LCAP purity for the reaction mixture, although the ratio of Compound IIa/Compound IIb increased to 90/10 (entry 21). These experiments indicated that ~15° C. was an appropriate temperature for an epimerization reaction in EtOH with 0.1 eq of TBD, and under these conditions a substantially chemically and diastereomerically pure crystalline ethanol solvate of Compound IIa could be obtained in ~32% yield for the 2$^{nd}$ crop.

TABLE 3

Epimerization with TBD and EtOH

| Entry | Temperature | IIa/IIb | LCAP |
|---|---|---|---|
| 14 | −5 ± 2° C. | 5 h: 23/77 | 5 h: 81.3% |
|  |  | 24 h: 40/60 | 24 h: 71.6% |
| 15 | 5 ± 2° C. | 5 h: 28/72 | 5 h: 82.4% |
|  |  | 24 h: 49/51 | 24 h: 77.7% |
| 16 | 5 ± 2° C. | 16 h: 48/52 | 16 h: 79.3% |
|  |  | Solid (5.5 g): 99.6% | Solid: 99% |
| 17 | 10 ± 2° C. | 24 h: 70/30 | 24 h: 77.8 |
| 18 | 12 ± 2° C. | 16 h: 64/36 | 16 h: 70.9% |
|  |  | 24 h: 68/32 | 24 h: N/A |
| 19 | 15 ± 2° C. | 5 h: 65/35 | 5 h: 77.7% |
|  |  | 24 h: 75/25 | 24 h: 77.8% |
| 20 | 15 ± 2° C. | 5 h: 71/29 | 5 h: 75.6% |
|  |  | 24 h: 82/18 | 24 h: 73.6% |
|  |  | Solid (9.5 g): 99.9% | Solid: 98.4% |
| 21 | 20 ± 2° C. | 24 h: 90/10 | 24 h: 54.8% |

Reaction Conditions: Crude IIa/IIb (15/85, LCAP: 83.7%; 2 g, except 16, 17 and 19: 20 g,) was stirred with 0.1 eq. of TBD in EtOH (2 V) at different temperature.

Screening Different Solvent for Epimerization Reaction:

Different solvents were screened to epimerize the crude IIa/IIb mixture obtained from the mother liquor of the 1st crop of IIa. The crude mixture (LCAP: 83%, chiral IIa/IIb: 17%/83%) was stirred in these solvents in the presence of TBD (0.1 eq) at 15° C. for 24 h. With EtOH, a high ratio of IIa/IIb of 90%/10% was achieved for the reaction mixture (entry 22). However, decomposition of IIa was severe with purity of the reaction mixture determined to be only ~37% by HPLC. Only slight decomposition (78% purity by HPLC) was observed in EtOAc as the solvent and the ratio of IIa/IIb was 53%/47% (entry 23). Similar results were obtained using IPA as the solvent, namely, 78% purity by HPLC and 49%/51% ratio of IIa/IIb (entry 24).

TABLE 4

Screening different solvent for epimerization reaction with TBD

| Entry | Solvent | LCAP | IIa/IIb |
|---|---|---|---|
| 22 | EtOH | 37% | 90/10 |
| 23 | EtOAc | 78% | 53/47 |
| 24 | i-PrOH | 78% | 49/51 |
| 25 | n-PrOH | 74% | 1/1 |
| 26 | n-BuOH | 76% | 1/1 |
| 27 | t-BuOH | 78% | 47/52 |
| 28 | 2-MeTHF | 68% | 45/54 |
| 29 | CH$_3$CN | 56% | 48/51 |
| 30 | DCM | 78% | 40/60 |
| 31 | THF | 59% | 45/54 |
| 32 | DMF | 62% | 44/56 |
| 33 | Acetone | 63% | 46/54 |
| 34 | DMSO | 63% | 43/56 |

Reaction Conditions: IIa/IIb (LCAP: 83%, chiral IIa/IIb: 17%/83%) (0.5 g, 1 eq) and TBD (15 mg, 0.1 eq) were stirred in different solvents (2 V) at 15° C. for 24 h.

i-PrOH as Solvent for Dynamic Crystallization (i.e., Crystallization and Epimerization)

Different solvents (EtOH, EtOAc, i-PrOH, n-PrOH, n-BuOH, t-BuOH, THF, 2-MeTHF, CH$_3$CN and acetone) were screened starting with substantially chemically and diastereomerically pure Compound IIa and TBD (0.1 eq) in at 15° C. for 2 h with the objective of optimizing the epimerization reaction with minimum chemical decomposition. Data in the following table is collected from various solvents. i-PrOH affords good epimerization with minimal chemical decomposition after 2 h in which a IIa/IIb ratio of 57%/42% with 91.8% chemical purity is obtained (see entry 37).

| Entry | Solvent | LCAP | IIa/IIb |
|---|---|---|---|
| 35 | EtOH | 60% | 61%/38% |
| 36 | EtOAc | 77% | 1/1 |
| 37 | i-PrOH | 91.8% | 57%/42% |
| 38 | n-PrOH | 56.4% | 58.5%/41.5% |
| 39 | n-BuOH | 62.4% | 51%/49% |
| 40 | t-BuOH | 87.3% | 55%/45% |
| 41 | THF | 84% | 54%/46% |
| 42 | 2-MeTHF | 75% | 54%/45% |
| 43 | CH$_3$CN | 82.6% | 53%/47% |
| 44 | Acetone | 88.3% | 55%/45% |

Using TBD in EtOH/n-Heptane for Epimerization

In entries 45 and 46, a mixture of Compounds IIa and IIb was dissolved in ethanol in the presence of TBD (0.07 or 0.10 eq). Upon stirring the reaction mixture for a specified amount of time, n-heptane was added to the solution before filtering the solid. Crystalline ethanol solvate of Compound IIa was collected as a solid in 99+% chiral purity and 99+% LCAP.

| Entry | Solvent | TBD/Temp | Rxn Mix | Solid | Mother Liquor |
|---|---|---|---|---|---|
| 45 | EtOH (3 V) + Heptane (3 V) before filtration | TBD: 0.07 eq. 14~16° C. | 18 h: 79/21 LCAP: 82.6% | 16.5 g (~60% yield) 99.79% LCAP: 99.19% | 21/79 LCAP: 59.3% Crude solid 11 g, 21/79 LCAP: 57.8% |
| 46 | EtOH (3 V) + Heptane (3 V) before filtration | TBD: 0.10 eq. 13~17° C. | 5 h: 76/24 LCAP: 83.9% 20 h: 87/13 LCAP: 81.6% | 17.5 g (~63% yield) 99.82% LCAP: 99.19% | Crude solid 9.5 g 31/69 LCAP: 46.9% |

While a number of embodiments have been described herein, the scope of this disclosure is to be defined by the appended claims, as well as by the specific embodiments that have been included here by way of example. The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

The invention claimed is:

1. A method for preparing Compound I

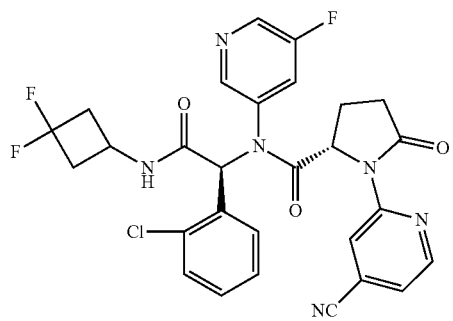

comprising isolating a crystalline ethanol solvate of Compound IIa

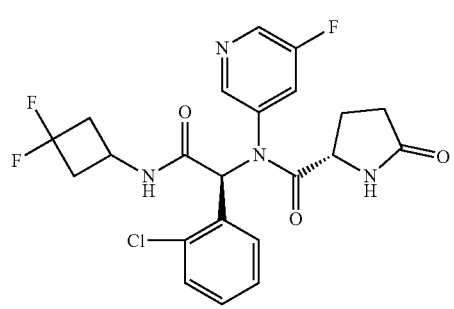

and converting the ethanol solvate of Compound IIa to Compound I or a solvate thereof.

2. The method of claim 1, wherein isolating the crystalline ethanol solvate of Compound IIa comprises crystallizing Compound IIa from a mixture of the compounds of Formula II

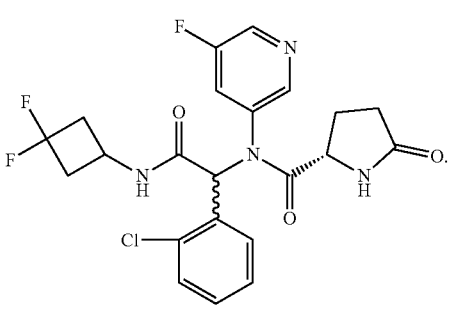

3. The method of claim 1, wherein converting the crystalline ethanol solvate of Compound IIa comprises reacting Compound IIa with 2-halo-4-cyanopyridine to afford Compound I.

4. The method of claim 2, wherein crystallizing the crystalline ethanol solvate of Compound IIa comprises suspending or dissolving a diastereomeric mixture of the compounds of Formula II in an ethanol solvent system, adding a base, and stirring the mixture at between 0 and 25° C., and adding at least one non-polar solvent.

5. The method of claim 4, wherein the base is selected from the groups consisting of 1,5,7-triazabicyclo [4.4.0]dec-5-ene ("TBD"), 1,5-diazabicyclo [4.3.0]non-5-ene ("DBN"), triethylamine, diisopropyl amine, N,N-diisopropyl ethylamine, N-methylmorpholine, morpholine, N-methyl-piperazine, pyridine, butylamine, dibutylamine, or a mixture thereof.

6. The method of claim 2 wherein the mixture of compounds of Formula II are made by reacting 2-chlorobenzaldehyde with 5-fluoropyridin-3-amine in methanol, followed by reacting the resulting product with(S)-5-oxopyrrolidine-2-carboxylic acid and 1,1-difluoro-3-isocyanatocyclobutane to afford a mixture of compounds of Formula II.

7. The method of claim 1 comprising reacting the crystalline ethanol solvate of Compound IIa with 2-bromoisonicotinonitrile to afford Compound I.

8. The method of claim 1, comprising reacting the crystalline ethanol solvate of Compound IIa with ethyl 2-bromoisonicotinate to give intermediate S9:

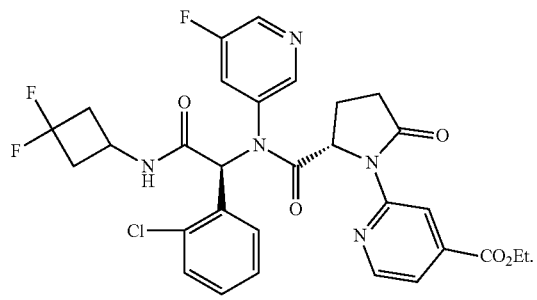

S9

9. The method of claim 8, comprising reducing the intermediate S9 in the presence of NH₃ to provide amide S10:

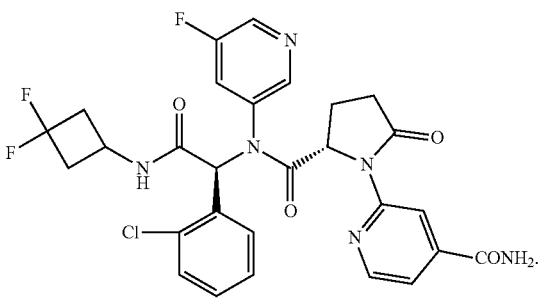

S10

10. The method of claim 9, comprising mixing S10 with trifluoroacetic anhydride (TFAA) in the presence of pyridine to afford Compound I.

11. The method of claim 1, wherein the crystalline ethanol solvate of Compound IIa is characterized by an X-ray powder diffraction (XRPD) pattern comprising one or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

12. The method of claim 1, wherein the crystalline ethanol solvate of Compound IIa is characterized by an X-ray powder diffraction (XRPD) pattern comprising three or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

13. The method of claim 1, wherein the crystalline ethanol solvate of Compound IIa is substantially chemically and diastereomerically pure.

14. The method of claim 1, wherein the crystalline ethanol solvate of Compound IIa has a diastereomeric purity of between about 90% to about 99%.

15. The method of claim 1, wherein the crystalline ethanol solvate of Compound IIa has a chemical purity of between about 80% to about 99%.

16. A method for preparing a crystalline ethanol solvate of Compound IIa:

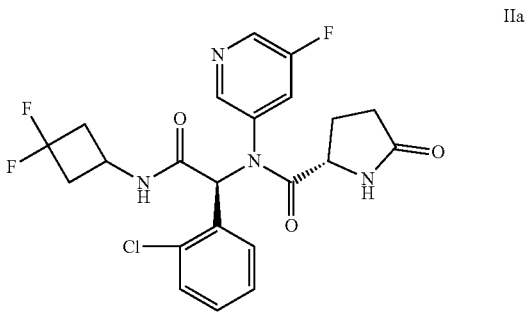 [SMILES: O=C1CC[C@@H](C(=O)N(c2cncc(F)c2)[C@H](C(=O)NC2CC(F)(F)C2)c2ccccc2Cl)N1]

IIa comprising suspending or dissolving a mixture of Compounds of Formula II

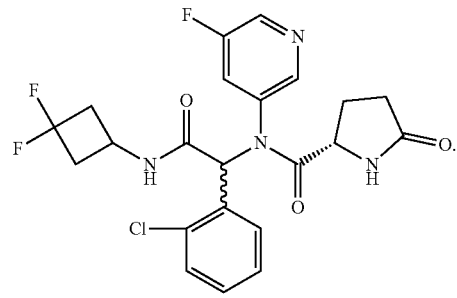 [SMILES: O=C1CC[C@@H](C(=O)N(c2cncc(F)c2)C(C(=O)NC2CC(F)(F)C2)c2ccccc2Cl)N1]

and a base in an ethanol solvent system, adding at least one non-polar solvent, and isolating a crystalline ethanol solvate of Compound IIa.

17. The method of claim 16, wherein the base is selected from the group consisting of 1,5,7-triazabicyclo [4.4.0]dec-5-ene ("TBD"), 1,5-diazabicyclo [4.3.0]non-5-ene ("DBN"), triethylamine, diisopropyl amine, N,N-diisopropyl ethylamine, N-methylmorpholine, morpholine, N-methyl-piperazine, pyridine, butylamine, dibutylamine, or a mixture thereof.

18. The method of claim 16, wherein the crystalline ethanol solvate of Compound IIa is substantially chemically and diasteromerically pure.

19. The method of claim 16, wherein the crystalline ethanol solvate of Compound IIa has a diastereomeric purity of between about 90% to about 99%.

20. The method of claim 16, wherein the crystalline ethanol solvate of Compound IIa is characterized by an X-ray powder diffraction (XRPD) pattern that is substantially as depicted in FIG. 1.

21. The method of claim 16, wherein the crystalline ethanol solvate of Compound IIa is characterized by an X-ray powder diffraction (XRPD) pattern comprising one or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

22. The method of claim 16, wherein the crystalline ethanol solvate of Compound IIa is characterized by an X-ray powder diffraction (XRPD) pattern comprising three or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

23. The method of claim 16, wherein the crystalline ethanol solvate of Compound IIa has a chemical purity of between about 80% to about 99%.

24. A crystalline ethanol solvate of Compound IIa:

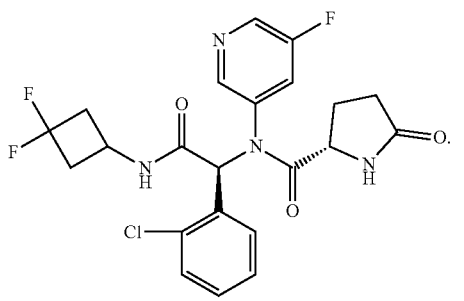

IIa

25. The crystalline ethanol solvate of claim 24, wherein the crystalline ethanol solvate of Compound IIa is characterized by an X-ray powder diffraction (XRPD) pattern that is as substantially as depicted in FIG. 1.

26. The crystalline ethanol solvate of claim 24, wherein the crystalline ethanol solvate of Compound IIa is characterized by an X-ray powder diffraction (XRPD) pattern comprising one or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

27. The crystalline ethanol solvate of claim 24, wherein the crystalline ethanol solvate of Compound IIa is characterized by an X-ray powder diffraction (XRPD) pattern comprising three or more of the following peaks at 2θ:7.2°±0.2°, 8.6°±0.2°, 12.2°±0.2°, 13.1°±0.2°, 14.4°±0.2°, 16.7°±0.2°, 19.4°±0.2°, 19.8°±0.2°, 21.8°±0.2° and 25.2°±0.2°.

28. The crystalline ethanol solvate of claim 24 having a diastereomeric purity of between about 90% to about 99%.

29. The crystalline ethanol solvate of claim 24 having a diastereomeric purity of at least about 99%.

30. The crystalline ethanol solvate of claim 24 that is substantially chemically and diastereomerically pure.

31. The crystalline ethanol solvate of claim 24 having a chemical purity of between about 80% to about 99%.

* * * * *